US005727028A

United States Patent [19]
Ghosh et al.

[11] Patent Number: 5,727,028
[45] Date of Patent: Mar. 10, 1998

[54] METHOD AND APPARATUS FOR RECEIVING A SIGNAL IN A DIGITAL RADIO FREQUENCY COMMUNICATION SYSTEM

[75] Inventors: Amitava Ghosh, Vernon Hills, Ill.; Kamyar Rohani, Grapevine, Tex.

[73] Assignee: Motorola, Inc., Schaumburg, Ill.

[21] Appl. No.: 690,606

[22] Filed: Jul. 31, 1996

[51] Int. Cl.⁶ .............................. H04L 27/06; H03D 1/00
[52] U.S. Cl. ........................... 375/340; 375/341; 375/325
[58] Field of Search ..................................... 375/340, 341, 375/261, 262, 265, 346, 285, 324, 325, 371, 362; 455/296, 50.1, 52.1, 53.1, 54.1, 63

[56] References Cited

U.S. PATENT DOCUMENTS

| | | | |
|---|---|---|---|
| 5,191,598 | 3/1993 | Backstrom et al. | 375/340 |
| 5,581,580 | 12/1996 | Lindbom et al. | 375/340 |
| 5,596,607 | 1/1997 | Larsson et al. | 375/340 |

OTHER PUBLICATIONS

R. Walton and M. Wallace, "Near Maximum Likelihood Demodulation for M-ary Orthogonal Signalling [sic]", IEEE VTC, pp. 5-8 (1993).

Primary Examiner—Stephen Chin
Assistant Examiner—Hai H. Phan
Attorney, Agent, or Firm—Heather L. Creps

[57] ABSTRACT

The apparatus includes a demodulator (70) responsive to a first received symbol (68) associated with a first transmitted symbol (39). The demodulator has a plurality of outputs (72) and produces a first set of outputs (99). The demodulator (70) is also responsive to a second received symbol (68) associated with a second transmitted symbol (39), and produces a second set of outputs (99). A coherent detector (100) receives some outputs from the first set of outputs (99), producing an estimate of the first transmitted symbol. The coherent detector also receives some outputs from the second set of outputs (99), producing an estimate of the second transmitted symbol. A first energy value (135) and an index (101) are associated with the first estimate, while a second energy value (135) is associated with the second estimate. A averaging circuit (150), which determines an average of the first energy value (135) and the second energy value (135) to produce an average energy value (140), is responsive to the coherent detector (100). A first combiner (130) is responsive to the coherent detector (100), combining the index (101) and the first energy value (135) to produce a weighted index (131). A second combiner (133) is responsive to the averaging circuit (150) and is also responsive to the first combiner (130), combining the weighted index (131) and the average energy value (140) to produce a channel-coded index (141). A deinterleaver (80) is responsive to the second combiner (133), receiving the channel-coded index (141).

19 Claims, 4 Drawing Sheets

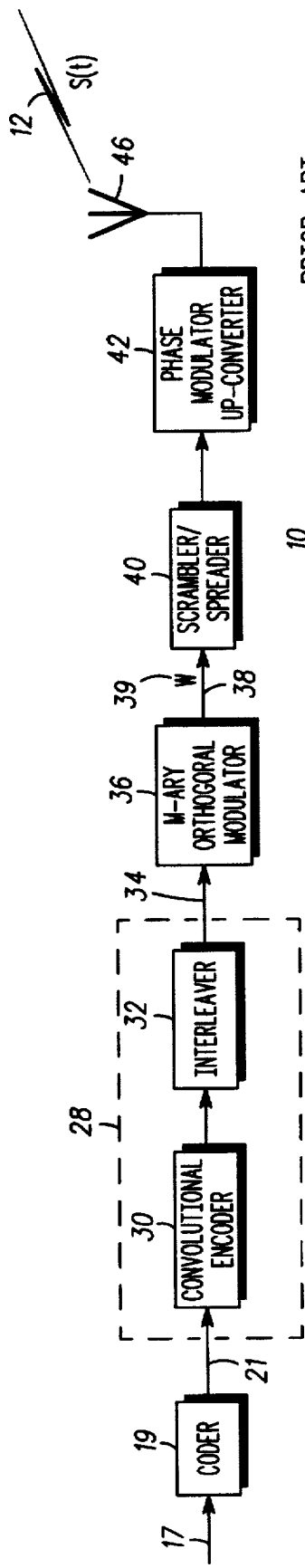
*FIG. 2* —PRIOR ART—
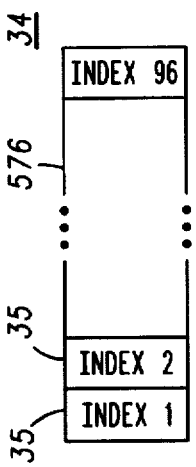
*FIG. 3* —PRIOR ART—

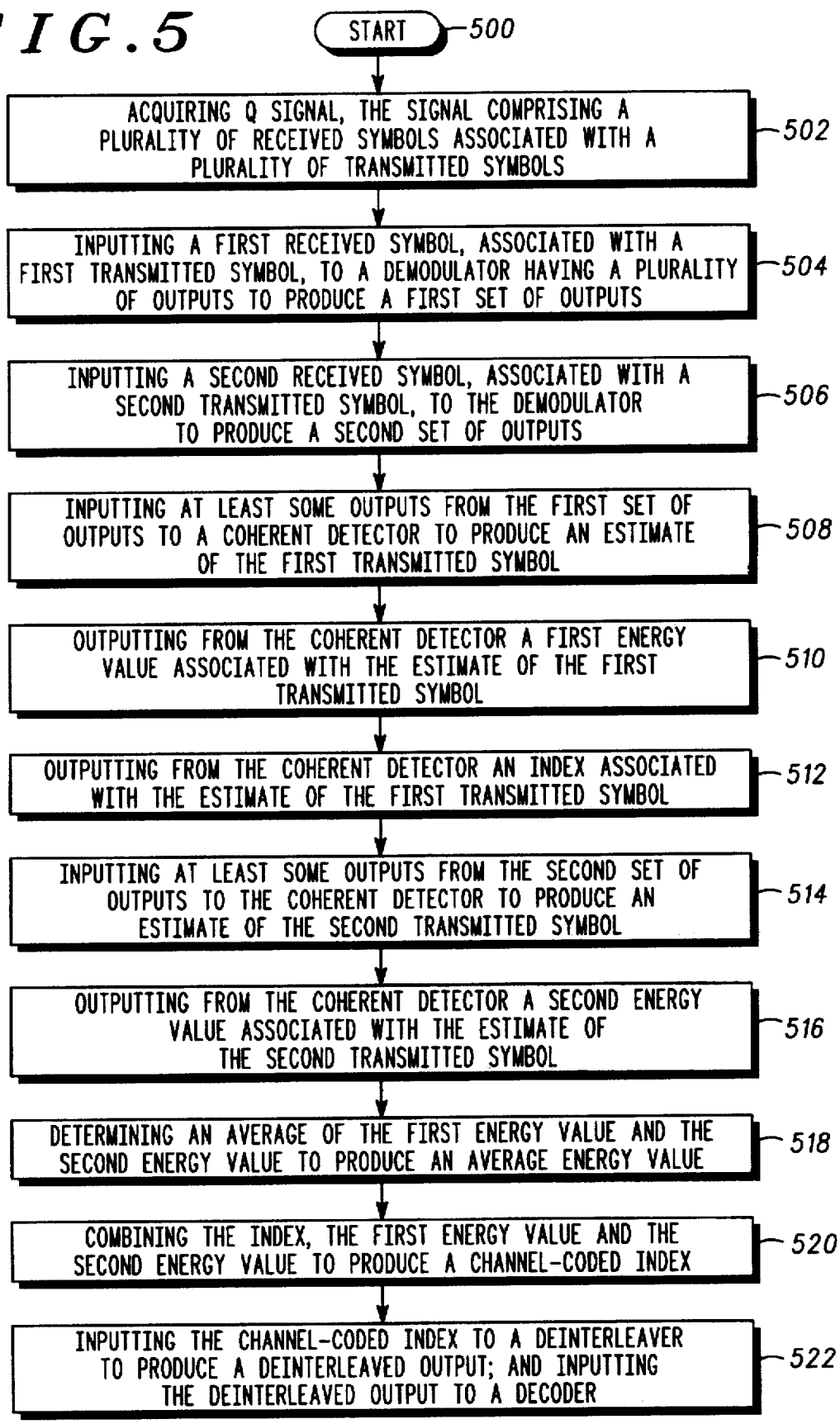

METHOD AND APPARATUS FOR RECEIVING A SIGNAL IN A DIGITAL RADIO FREQUENCY COMMUNICATION SYSTEM

FIELD OF THE INVENTION

This invention relates generally to wireless communication systems, and, more particularly, to a method and apparatus for receiving a signal in a digital radio frequency communication system.

BACKGROUND OF THE INVENTION

In a typical wireless communication system such as a digital radio frequency (RF) radiotelephone system, a base station having a controller and a plurality of transmitters and receivers communicates via an RF channel with a mobile station operating within an area served by the base station.

Transmitting a communication signal over an RF channel through a medium such as air causes a received communication signal to significantly differ from the originally transmitted communication signal. For example, the originally transmitted communication signal may be altered by slowly-changing channel parameters such as channel gain, phase shift and time delay, and may further be corrupted by an amount of noise.

To produce an estimate of the originally transmitted signal using a coherent receiver, it is desirable for the coherent receiver to accurately estimate the RF channel, accounting for changes in slowly-changing channel parameters such as phase shifts. In addition, it is desirable for the coherent receiver to minimize the effects of channel noise.

There is therefore a need for an improved method and apparatus for coherently receiving a signal in a digital radio frequency communication system which effectively utilizes channel estimates and which reduces the effects of phase shifts and noise.

SUMMARY OF THE INVENTION

According to an aspect of the present invention, the foregoing need is addressed by a method for receiving a signal in a digital radio frequency communication system including acquiring the signal, the signal comprising a plurality of received symbols associated with a plurality of transmitted symbols; inputting a first received symbol, associated with a first transmitted symbol, to a demodulator having a plurality of outputs to produce a first set of outputs, the first received symbol; inputting a second received symbol, associated with a second transmitted symbol, to the demodulator to produce a second set of outputs, the second received symbol; inputting at least some outputs from the first set of outputs to a coherent detector to produce an estimate of the first transmitted symbol; outputting from the coherent detector a first energy value associated with the estimate of the first transmitted symbol; outputting from the coherent detector an index associated with the estimate of the first transmitted symbol, the index comprising a plurality of bits; inputting at least some outputs from the second set of outputs to the coherent detector to produce an estimate of the second transmitted symbol; outputting from the coherent detector a second energy value associated with the estimate of the second transmitted symbol; determining an average of the first energy value and the second energy value to produce an average energy value; combining the index, the first energy value and the average energy value to produce a channel-coded index; inputting the channel-coded index to a deinterleaver to produce a deinterleaved output; and inputting the deinterleaved output to a decoder.

According to another aspect of the present invention, an apparatus for receiving a signal in a digital radio frequency communication system, the signal comprising a plurality of received symbols associated with a plurality of transmitted symbols, includes a demodulator which is resonsive to a first received symbol associated with a first transmitted symbol. The demodulator has a plurality of outputs and produces a first set of outputs. The demodulator is also responsive to a second received symbol associated with a second transmitted symbol, and produces a second set of outputs. A coherent detector, receives at least some outputs from the first set of outputs and produces an estimate of the first transmitted symbol. The coherent detector also receives at least some outputs from the second set of outputs and produces an estimate of the second transmitted symbol. A first energy value and an index are associated with the first estimate, while a second energy value is associated with the second estimate. A averaging circuit, which determines an average of the first energy value and the second energy value to produce an average energy value, is responsive to the coherent detector. A first combiner is responsive to the coherent detector, combining the index and the first energy value to produce a weighted index. A second combiner is responsive to the averaging circuit and is also responsive to the first combiner, combining the weighted index and the average energy value to produce a channel-coded index. A deinterleaver is responsive to the second combiner, receiving the channel-coded index.

According to a further aspect of the present invention, an apparatus for receiving a signal in a digital radio frequency communication system, the signal comprising a plurality of received symbols associated with a plurality of transmitted symbols, includes means for demodulating a first received symbol and a second received symbol, the first received symbol associated with a first transmitted symbol, the second received symbol associated with a second transmitted symbol; means for estimating the first transmitted signal and the second transmitted signal, responsive to the first received symbol and the second received symbol, producing a first energy value and an index associated with the first estimate and producing a second energy value associated with the second estimate; means for averaging the first energy value and the second energy value to produce an average energy value; first means for combining, responsive to the first energy value and the index, producing a weighted index; second means for combining, responsive to the weighted index and the average energy value, producing a channel-coded index; means for deinterleaving the channel-coded index, outputting a deinterleaved signal; and means for decoding the deinterleaved signal.

Advantages of the present invention will become readily apparent to those skilled in the art from the following description of the preferred embodiment of the invention which has been shown and described by way of illustration. As will be realized, the invention is capable of other and different embodiments, and its details are capable of modifications in various respects. Accordingly, the drawings and description are to be regarded as illustrative, and not as restrictive.

BRIEF DESCRIPTION OF THE DRAWINGS

FIG. 2 is a block diagram of a base station transmitter for generating a communication signal waveform.

FIG. 3 is a diagram of a digitally encoded and interleaved frame created by the transmitter of FIG. 2.

FIG. 5 is a flowchart of a method for receiving the communication signal waveform generated by the transmitter depicted in FIG. 2, according to a preferred embodiment of the present invention.

DETAILED DESCRIPTION OF THE PREFERRED EMBODIMENTS

Figure 1:
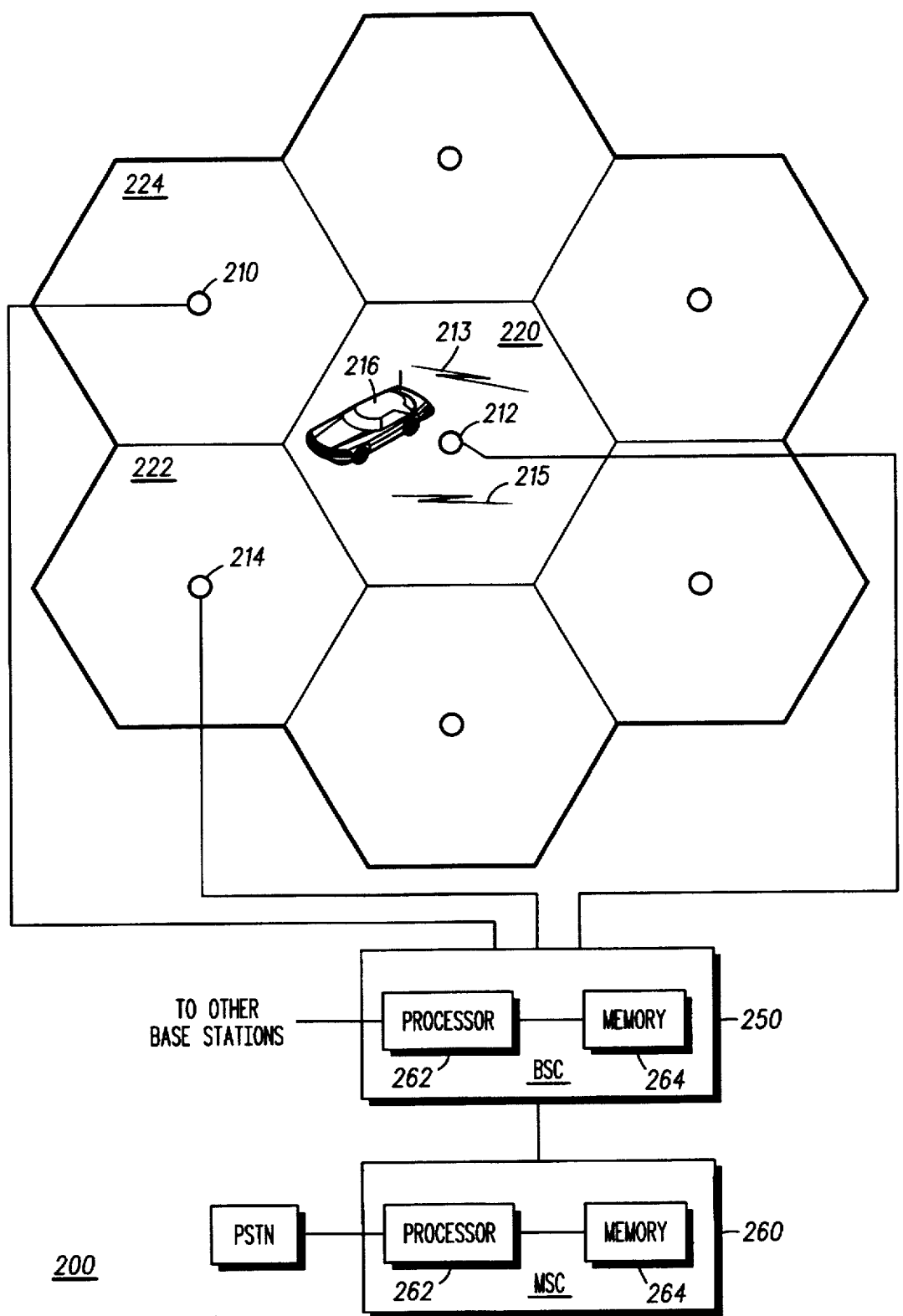
FIG. 1 is a block diagram of a typical wireless communication system.

Turning now to the drawings, wherein like numerals designate like components, FIG. 1 illustrates a wireless communication system 200 such as a code division multiple access (CDMA) digital radiotelephone system. Base stations 210, 212 and 214 communicate with a mobile station 216 operating within an area 220 served by base station 212. Areas 222 and 224 are served by base stations 214 and 210, respectively. Base stations 210, 212 and 214 are coupled to a base station controller 250, which includes, among other things, a processor 262 and a memory 264, and which is in turn coupled to a mobile switching center 260, also including a processor 262 and a memory 264.

Multiple access wireless communication between base stations 210, 212 and 214 and mobile station 216 occurs via radio frequency (RF) channels which provide physical paths over which digital communication signals such as voice, data and video are transmitted. Base-to-mobile station communications are said to occur on a forward-link channel, while mobile-to-base station communications are referred to as being on a reverse-link channel. A communication system using CDMA channelization is described in detail in TIA/EIA Interim Standard IS-95A, Mobile Station-Base Station Compatibility Standards for Dual-Mode Wideband Spread Spectrum Cellular Systems, Telecommunications industry Association, Washington, D.C. July 1993 (IS-95A) , and "TIA Telecommunications Systems Bulletin: Support for 14.4 kbps Data Rate and PCS Interaction for Wideband Spread Spectrum Cellular Systems", February 1996 (the Bulletin), both IS-95A and the Bulletin incorporated herein by reference.

As shown in FIG. 1, communication signal 213 has been transmitted on an IS-95 forward-link channel such as a Paging Channel or a Traffic Channel by base station 212 to mobile station 216. Communication signal 215 has been transmitted via an IS-95 reverse-link channel such as an Access Channel or a Traffic Channel by mobile station 216 to base station 212.

FIG. 2 is a block diagram of a transmitter 10, for use in a mobile station such as mobile station 216, for generating communication signal 215. A data bit stream 17, which may be voice, video or another type of information, enters a variable-rate coder 19, which produces a signal 21 comprised of a series of transmit channel frames having varying transmit data rates. The transmit data rate of each frame depends on the characteristics of data bit stream 17.

Encoder block 28 includes a convolutional encoder 30 and an interleaver 32. At convolutional encoder 30, transmit channel frame may be encoded by a convolutional encoder using well-known algorithms such as convolutional encoding algorithms which facilitate subsequent decoding of the frames. Interleaver 32 operates to shuffle the contents of the frames using commonly-known techniques such as block interleaving techniques.

As shown in FIG. 3, each twenty millisecond frame 34 of digitally coded and interleaved bits includes ninety-six groups of six coded bits, for a total of 576 bits. Each group of six coded bits represents an index 35 to one of sixty-four symbols such as Walsh codes. A Walsh code corresponds to a single row or column of a sixty-four-by-sixty-four Hadamard matrix, a square matrix of bits with a dimension that is a power of two. Typically, the bits comprising a Walsh code are referred to as Walsh chips.

Referring again to FIG. 2, each of the ninety-six Walsh code indices 35 in frame 34 are input to an M-ary orthogonal modulator 36, which is preferably a sixty-four-ary orthogonal modulator. For each input Walsh code index 35, M-ary orthogonal modulator 36 generates at output 38 a corresponding sixty-four-bit Walsh code W 39. Thus, a series of ninety-six Walsh codes W 39 is generated for each frame 34 input to M-ary orthogonal modulator 36. Six Walsh codes W 39 are generally referred to as a power control group.

Scrambler/spreader block 40, among other things, applies a pseudorandom noise (PN) sequence to the series of Walsh codes W 39 using well-known scrambling techniques. At block 42, the scrambled series of Walsh codes W 39 is phase modulated using an offset quaternary phase-shift keying (OQPSK) modulation process or another modulation process, up-converted and transmitted as communication signal S(t) 12 from antenna 46.

Figure 4:
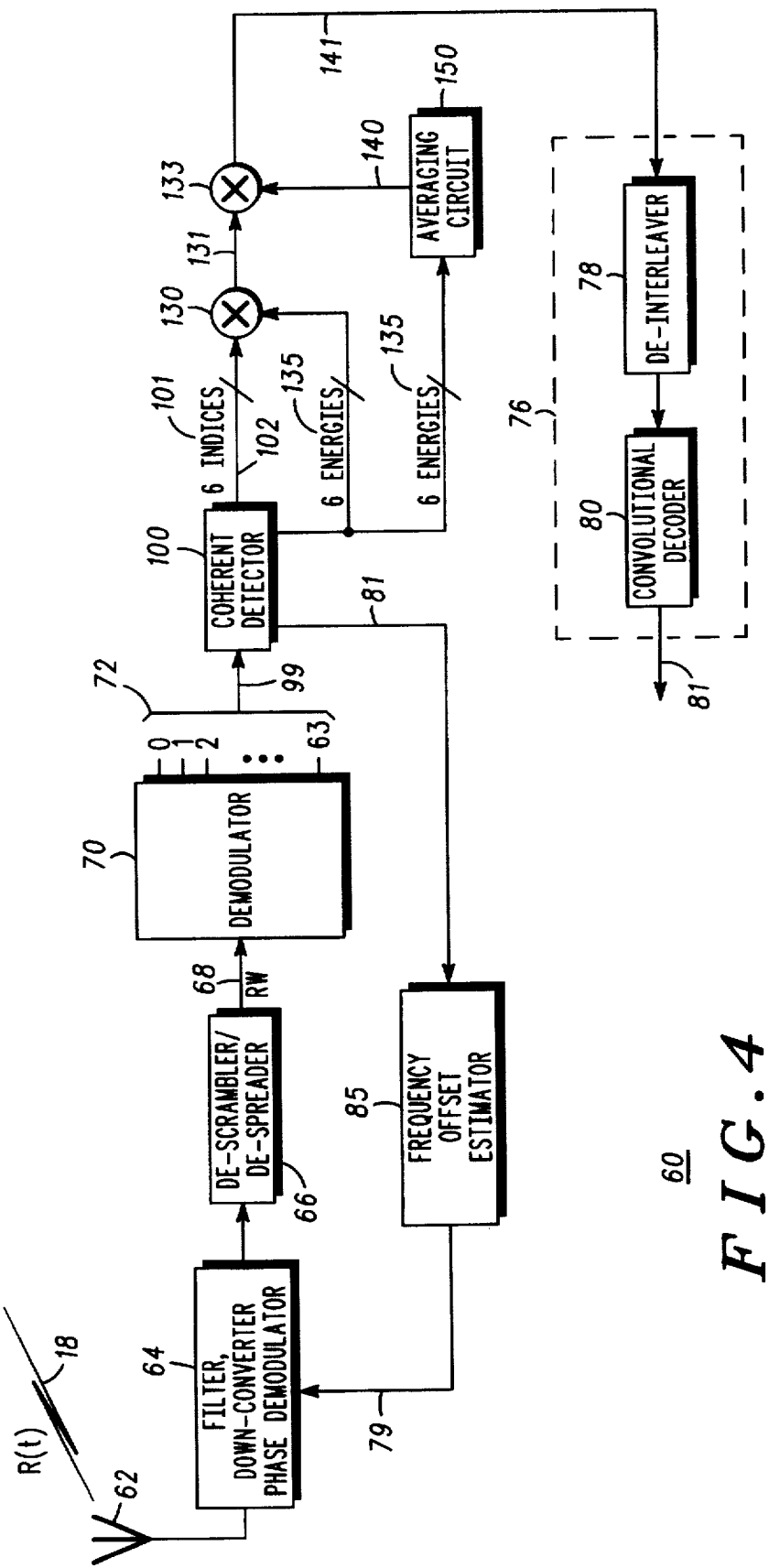
FIG. 4 is a partial block diagram of an apparatus for receiving the communication signal waveform generated by the transmitter depicted in FIG. 2, according to a preferred embodiment of the present invention.

FIG. 4 is a partial block diagram of an apparatus 60 within a base station such as base station 212 (shown in FIG. 1), for receiving communication signal R(t), originally transmitted by mobile station 216 as communication signal S(t) 12. Receiver 60 is preferably a RAKE receiver having a number of fingers, although only a single finger is shown. Receiver 60 is preferably coherent, but may be non-coherent or quasi-coherent. Multiple receivers 60 may also be utilized.

Antenna 62 receives communication signal R(t) 18, which comprises a number of received frames. Front-end processing such as filtering, frequency down-converting and phase demodulation of communication signal R(t) 18 is performed by well-known methods and circuits at block 64.

De-scrambler/de-spreader block 66, among other things, removes the PN code applied by scrambler block 40 (shown in FIG. 2) to the series of Walsh codes W 39 (also shown in FIG. 2). In the IS-95 reverse-link channel, a received power control group of received signal 18 includes six received symbols, or Walsh codes, which are each sixty-four bits long. The received Walsh codes have been altered during transmission by various channel parameters, however, and simply appear to receiver 60 to be received signal samples. Nevertheless, the received Walsh codes are referred to herein as received Walsh codes RW.

Referring again to FIG. 4, each received Walsh code RW 68, after leaving de-scrambler/de-spreader 66, is input to an orthogonal demodulator 70, such as a Fast Hadamard Transform (FHT). FHT 70 may be implemented using commercially available hardware as an array of adders or as a multiplexed adder, depending on its size. Alternatively, FHT 70 may be implemented utilizing a conventional digital signal processor (DSP) such as a Motorola DSP, part no. 56166 or an application specific integrated circuit (ASIC).

Upon receiving a received Walsh code RW 68, FHT 70 generates a number of output signals 72. Outputs 72 associated with a particular received Walsh code RW 68 input to FHT 70 are referred to as a set of outputs 99. In the IS-95 reverse link channel, when a received Walsh code RW 68 is input to FHT 70, sixty-four output signals 72, which correlate to sixty-four possible transmitted Walsh codes 39, are produced.

Each output signal 72 includes an index (not shown) which references one of the sixty-four possible Walsh codes W 39 generated by M-ary orthogonal modulator 36 (shown in FIG. 2). In addition to including an index, each output signal 72 also includes an associated complex number (not shown), and further includes an associated energy value (not shown). The energy value is commonly calculated by squaring the real and imaginary portions of the complex number, adding the squared values, and taking the absolute value of the result. The energy value generally corresponds to a measure of confidence, or a likelihood, that output signal 72 indexes a Walsh code W 39 which corresponds to a group of received Walsh codes RW 68 input to FHT 70.

Coherent detector 100 accepts sets of output signals 99 from FHT 70. Coherent detector 100 is preferably a maximum likelihood sequence estimator (MLSE), which may be implemented in a variety of ways in hardware or software using well-known methods. A description of a maximum likelihood sequence estimator suitable for use in an IS-95A base station receiver is included in R. Walton and M. Wallace, "Near Maximum Likelihood Demodulation for M-ary Orthogonal Signalling [sic]", IEEE VTC, pp. 5–8 (1993), incorporated herein by reference.

Coherent detector 100 is preferably operated once per power control group, that is, once for every six consecutive sets of outputs. For each set of output signals 99 input to detector 100, one output signal 102 is generated, representing the "winning" output signal from the particular set of output signals 99. There are, of course, sixty-three "losing" output signals (discussed further below). Thus, for each power control group, a total of six output signals 102 is generated.

Like output signals 72 from FHT 70, each output signal 102 includes an index 101 (discussed further below), which references one of sixty-four possible Walsh codes W 39 generated by M-ary orthogonal modulator 36 (shown in FIG. 2). Index 101 is preferably six bits wide. An output signal 102 also includes a complex number (not shown), having a real portion and an imaginary portion. The complex number represents a channel estimate, that is, an estimate of channel parameters such as phase shift, channel gain and noise, over a time period of one received Walsh code RW 68. Each output signal 102 further includes an associated energy value 135 (discussed further below), calculated by magnitude-squaring the complex number. Energy value 135 generally corresponds to a measure of confidence, or a likelihood, that output signal 102 indexes a Walsh code W 39 which corresponds to a group of received Walsh codes RW 68.

According to a preferred embodiment of the present invention, a six-bit index 101 of an output signal 102 is input to combiner 130, which may be, for example, a multiplier circuit. Combiner 130 performs bitwise multiplication of six-bit index 101 and the energy values of six consecutive output signals 102 in the power control group associated with six-bit index 101 to produce a weighted index at line 131. That is, a first bit of a first index associated with a first output signal 102 may be combined with the energy value associated with the first output signal 102, and a second bit of the first index associated with the first output signal 102 may be combined with the energy value associated with a second output signal 102, and so on. Combiner 130 preferably acts upon all six indices of a power control group in the same manner, resulting in a group of six weighted indices at line 131.

An averaging circuit 150, the construction and operation of such circuits being well-known, may compute an average of energy values 135 included in the six consecutive output signals 102 acted upon by combiner 130, producing an average energy value at line 140.

Combiner 133, which may be, for example, a multiplier circuit, receives the group of six weighted indices from line 131 and receives the average energy value from line 140. For each weighted index, combiner 133 performs bitwise multiplication of the weighted index and the average energy value, producing a channel-coded index at line 141. Combiner 133 preferably acts upon the entire group of six weighted indices, to generate a group of six channel-coded indices at line 141.

Decoder block 76, which may include a de-interleaver 78 and a convolutional decoder 80, such as a Viterbi decoder, receives the group of channel-coded indices from line 141, and further demodulates received signal R(t) 18, outputting signal 81, which is an estimate of transmitted signal 21 (shown in FIG. 2).

To further improve the estimate of transmitted signal 21, it may be desirable to determine the effect of noise and to subtract the noise from the complex numbers included in output signals 102. For example, a noise estimate may be obtained for a single output signal 102 by adding the complex numbers of the sixty-three "losing" output signals included in the single output signal 102. Because channel noise is a rapidly-changing channel parameter, to reduce the variance of noise estimates, the noise estimates may be averaged, or filtered in some other manner, over a number of power control groups, for example, over thirty-two power control groups (two full-rate frames).

A channel correction may also be performed by frequency offset estimator 85. Frequency offsets may arise, for example, from inaccuracies in clock oscillators and from Doppler shifts which occur when mobile station 216 (shown in FIG. 1) moves at high speeds. An automatic frequency control algorithm, which may be implemented at block 85 in either hardware or software using well-known techniques, is described below.

Let a channel estimate $\hat{E}_i$ for a single received Walsh code RW 68 be represented mathematically as follows: $\hat{E}_i = a_i (e^{j(\varnothing + i\Delta\partial)})$, where $\Delta\partial = 2\pi\Delta f T$, $\Delta f$ representing the frequency offset, $a_i$ and $\varnothing$ representing the magnitude and phase estimate of the channel, respectively, and T=1.25/6 milliseconds. Frequency offset estimator 85 computes an estimate of a frequency error over an entire power control group based on the values of channel estimates output from coherent detector 100. The computation may be performed as follows:

$$\sin\Delta\partial = Imag\left[ 1/5 \sum_{i=1} \frac{(\hat{E}_i \cdot \hat{E}_{i-1}*)}{|(\hat{E}_i \cdot \hat{E}_{i-1}*)|} \right]$$

Sin $\Delta\partial$ is approximately $\Delta\partial$, since Walsh symbol-to-Walsh symbol rotation is small.

Frequency offset estimator 85 may then utilize a least-mean square adaptive algorithm to produce a channel adjustment value $V_r$, $V_r = V_{r-1} + \mu \cdot E_{avg} \cdot \Delta\varnothing$, where $E_{avg}$ is the average energy value over one power control group (output from averaging circuit 150 at line 140), and $\mu$ is a constant. $V_r$ is output from frequency offset estimator 85 at line 79, and input to front-end block 64.

Methods and apparatuses for receiving signals in a digital radio frequency communication system, which combine maximum likelihood sequence estimation with channel coding, have been described herein. One preferred embodiment of a method for receiving a signal in a digital radio frequency communication system is outlined in the flowchart of FIG. 5. The method starts at block 500, and continues to block 502, where a first step includes acquiring a signal, the signal comprising a plurality of received symbols associated with a plurality of transmitted symbols. Block 504 depicts the step of inputting a first received symbol, associated with a first transmitted symbol, to a demodulator having a plurality of outputs to produce a first set of outputs. The step of inputting a second received symbol, associated with a second transmitted symbol, to the demodulator to produce a second set of outputs, is shown at block 506. Next, at block 508, the step of inputting at least some outputs from the first set of outputs to a coherent detector to produce an estimate of the first transmitted symbol is shown. Block 510 depicts outputting from the coherent detector a first energy value associated with the estimate of the first transmitted symbol. Block 512 shows outputting from the coherent detector an index associated with the estimate of the first transmitted symbol. The step of inputting at least some outputs from the second set of outputs to the coherent detector to produce an estimate of the second transmitted symbol is shown at block 514. Outputting from the coherent detector a second energy value associated with the estimate of the second transmitted symbol is illustrated at block 516. Block 518 shows determining an average of the first energy value and the second energy value to produce an average energy value. At block 520, the step of combining the index, the first energy value and the average energy value to produce a channel-coded index is shown. The steps of inputting the channel-coded index to a deinterleaver to produce a deinterleaved output and inputting the deinterleaved output to a decoder are shown at block 522.

Although receiver 60 has been described herein in terms of specific logical/functional circuitry and relationships, it is contemplated that receiver 60 may be configured in a variety of ways, such as with programmed processors or application-specific integrated circuits (ASICs). It should also be understood that when one element is responsive to another element, the elements may be directly or indirectly coupled.

The IS-95 reverse link channel has been specifically referred to herein, but the present invention is applicable to any digital channel, including but not limited to the forward-link IS-95 channel and to all forward- and reverse-link TDMA channels, in all TDMA systems, such as Groupe Special Mobile (GSM), a European TDMA system, Pacific Digital Cellular (PDC), a Japanese TDMA system, and Interim Standard 54 (IS-54), a U.S. TDMA system.

The principles of the present invention which apply to cellular-based digital communication systems may also apply to other types of communication systems, including but not limited to personal communication systems, trunked systems, satellite communication systems and data networks. Likewise, the principles of the present invention which apply to all types of digital radio frequency channels also apply to other types of communication channels, such as radio frequency signaling channels, electronic data buses, wireline channels, optical fiber links and satellite links.

It will furthermore be apparent that other and further forms of the invention, and embodiments other than the specific embodiments described above, may be devised without departing from the spirit and scope of the appended claims and their equivalents, and therefore it is intended that the scope of this invention will only be governed by the following claims and their equivalents.

We claim:

1. A method for receiving a signal in a digital radio frequency communication system, comprising the steps of:
    acquiring the signal, the signal comprising a plurality of received symbols associated with a plurality of transmitted symbols;
    inputting a first received symbol, associated with a first transmitted symbol, to a demodulator having a plurality of outputs to produce a first set of outputs, the first received symbol;
    inputting a second received symbol, associated with a second transmitted symbol, to the demodulator to produce a second set of outputs, the second received symbol;
    inputting at least some outputs from the first set of outputs to a coherent detector to produce an estimate of the first transmitted symbol;
    outputting from the coherent detector a first energy value associated with the estimate of the first transmitted symbol;
    outputting from the coherent detector an index associated with the estimate of the first transmitted symbol, the index comprising a plurality of bits;
    inputting at least some outputs from the second set of outputs to the coherent detector to produce an estimate of the second transmitted symbol;
    outputting from the coherent detector a second energy value associated with the estimate of the second transmitted symbol;
    determining an average of the first energy value and the second energy value to produce an average energy value;
    combining the index, the first energy value and the average energy value to produce a channel-coded index;
    inputting the channel-coded index to a deinterleaver to produce a deinterleaved output; and
    inputting the deinterleaved output to a decoder.

2. The method according to claim 1, wherein the step of combining further comprises the steps of:
    combining the index with the first energy value to produce a weighted index; and
    combining the weighted index with the average energy value to produce the channel-coded index.

3. The method according to claim 2, wherein the step of combining the index with the first energy value comprises bit-wise multiplication.

4. The method according to claim 2, wherein the step of combining the weighted index with the average energy value comprises bit-wise multiplication.

5. The method according to claim 1, wherein the first received symbol and the second received symbol comprise Walsh codes.

6. The method according to claim 1, wherein the index comprises a Walsh code index.

7. The method according to claim 1, wherein the demodulator comprises a Fast Hadamard Transform (FHT).

8. The method according to claim 1, wherein the coherent detector comprises a Maximum Likelihood Sequence Estimator (MLSE).

9. The method according to claim 1, wherein the decoder comprises a Viterbi decoder.

10. The method according to claim 1, wherein the estimate of the first transmitted symbol comprises a first complex number, the first complex number having a real portion and an imaginary portion.

11. The method according to claim 10, wherein the first energy value comprises a magnitude of a sum of the real portion squared and the imaginary portion squared.

12. The method according to claim 1, wherein the first energy value represents a likelihood that the first received symbol corresponds to the first transmitted symbol.

13. The method according to claim 1, further comprising the step of:

prior to inputting the at least some outputs from the first set of outputs to the coherent detector, storing the at least some outputs from the first set of outputs in a buffer.

14. The method according to claim 13, wherein the buffer comprises a random access memory.

15. The method according to claim 1, further comprising the step of:

using the first estimate and the second estimate to determine a frequency offset.

16. The method according to claim 15, further comprising the step of:

using the frequency offset to improve a performance of the coherent detector.

17. The method according to claim 1, further comprising the steps of:

computing a noise bias; and subtracting the noise bias from the first estimate and the second estimate.

18. An apparatus for receiving a signal in a digital radio frequency communication system, the signal comprising a plurality of received symbols associated with a plurality of transmitted symbols, the apparatus comprising:

means for demodulating a first received symbol and a second received symbol, the first received symbol associated with a first transmitted symbol, the second received symbol associated with a second transmitted symbol;

means for estimating the first transmitted symbol and the second transmitted symbol, responsive to the first received symbol and the second received symbol, producing a first energy value and an index associated with the first estimate and producing a second energy value associated with the second estimate;

means for averaging the first energy value and the second energy value to produce an average energy value;

first means for combining, responsive to the first energy value and the index, producing a weighted index;

second means for combining, responsive to the weighted index and the average energy value, producing a channel-coded index;

means for deinterleaving the channel-coded index, outputting a deinterleaved signal; and means for decoding the deinterleaved signal.

19. An apparatus for receiving a signal in a digital radio frequency communication system, the signal comprising a plurality of received symbols associated with a plurality of transmitted symbols, the apparatus comprising:

a demodulator having a plurality of outputs, the demodulator responsive to a first received symbol to produce a first set of outputs, the first received symbol associated with a first transmitted symbol, the demodulator also responsive to a second received symbol to produce a second set of outputs, the second received symbol associated with a second transmitted symbol;

a coherent detector, receiving at least some outputs from the first set of outputs to produce an estimate of the first transmitted symbol, and receiving at least some outputs from the second set of outputs to produce an estimate of the second transmitted symbol, a first energy value and an index associated with the first estimate, a second energy value associated with the second estimate;

a averaging circuit responsive to the coherent detector, determining an average of the first energy value and the second energy value to produce an average energy value;

a first combiner responsive to the coherent detector, combining the index and the first energy value to produce a weighted index;

a second combiner responsive to the averaging circuit and responsive to the first combiner, combining the weighted index and the average energy value to produce a channel-coded index;

a deinterleaver responsive to the second combiner, receiving the channel-coded index.

* * * * *